US012288311B1

(12) United States Patent
Oulés et al.

(10) Patent No.: US 12,288,311 B1
(45) Date of Patent: Apr. 29, 2025

(54) SYSTEM AND METHODS FOR SIMULATING CONTINUITY BETWEEN SEPARATE MEDIA ITEMS

(71) Applicant: GoPro, Inc., San Mateo, CA (US)

(72) Inventors: Anais Oulés, Bordeaux (FR); Guillaume Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 161 days.

(21) Appl. No.: 18/062,371

(22) Filed: Dec. 6, 2022

(51) Int. Cl.
*G06T 5/50* (2006.01)
*G06T 5/70* (2024.01)
*G06T 7/194* (2017.01)
*G06V 10/764* (2022.01)
*H04N 23/698* (2023.01)

(52) U.S. Cl.
CPC .............. *G06T 5/50* (2013.01); *G06T 5/70* (2024.01); *G06T 7/194* (2017.01); *G06V 10/764* (2022.01); *H04N 23/698* (2023.01); *G06T 2207/20221* (2013.01)

(58) Field of Classification Search
None
See application file for complete search history.

(56) References Cited

U.S. PATENT DOCUMENTS

| 6,477,268 | B1* | 11/2002 | Chiang | F04B 49/035 |
| | | | | 382/293 |
| 10,643,303 | B1* | 5/2020 | Cotoros | H04N 23/90 |
| 11,636,291 | B1* | 4/2023 | Zuo | G06F 18/24147 |
| | | | | 382/159 |
| 2009/0022422 | A1* | 1/2009 | Sorek | H04N 1/3876 |
| | | | | 382/284 |
| 2009/0309987 | A1* | 12/2009 | Kimura | H04N 21/21815 |
| | | | | 348/222.1 |
| 2010/0149422 | A1* | 6/2010 | Samuelsson | H04N 19/513 |
| | | | | 348/E5.062 |
| 2014/0002342 | A1* | 1/2014 | Fedorovskaya | G06Q 10/10 |
| | | | | 345/156 |
| 2015/0030246 | A1* | 1/2015 | Wilensky | G06T 5/70 |
| | | | | 382/167 |
| 2015/0062283 | A1* | 3/2015 | Mintz | H04N 7/141 |
| | | | | 348/14.07 |
| 2015/0228054 | A1* | 8/2015 | Takimoto | G06F 3/0488 |
| | | | | 345/672 |
| 2018/0315174 | A1* | 11/2018 | Staranowicz | G06T 5/70 |
| 2020/0275083 | A1* | 8/2020 | Yoneda | H04N 21/4728 |

* cited by examiner

*Primary Examiner* — Anh-Tuan V Nguyen
(74) *Attorney, Agent, or Firm* — Esplin & Associates, PC

(57) ABSTRACT

Scenes depicted within different media items may be used to generate in-between visual content for the different media items. The different media items may be combined by using the in-between visual content to fill a visual gap between the different media items. The in-between visual content may provide visual continuity between the different media items.

20 Claims, 6 Drawing Sheets

SYSTEM AND METHODS FOR SIMULATING CONTINUITY BETWEEN SEPARATE MEDIA ITEMS

FIELD

This disclosure relates to simulating continuity between separate media items via generation of in-between visual content to fill a visual gap between visual content of separate media items.

BACKGROUND

Creating interesting/pleasing transitions between separate media items (e.g., images, videos) may be difficult to create. For example, photo transitions in slide shows may be difficult to create as it requires dynamism from static visual content (still images).

SUMMARY

This disclosure relates to simulating continuity between separate media items. Media item information and/or other information may be obtained. The media item information may define a first media item, a second media item, and/or other media items. The first media item may include first visual content depicting a first scene. The second media item may include second visual content depicting a second scene. The first scene depicted in the first visual content and the second scene depicted in the second visual content may be determined. In-between visual content may be generated to fill a visual gap between the first visual content and the second visual content. The in-between visual content may be generated based on the first scene depicted in the first visual content, the second scene depicted in the second visual content, and/or other information. Combined visual content may be generated by using the in-between visual content to fill the visual gap between the first visual content and the second visual content.

A system for simulating continuity between separate media items may include one or more electronic storage, processor, and/or other components. The electronic storage may store media item information, information relating to media items, information relating to visual content, information relating to scenes depicted in visual content, information relating to in-between visual content, information relating to visual gap between visual content, information relating to combined visual content, and/or other information.

The processor(s) may be configured by machine-readable instructions. Executing the machine-readable instructions may cause the processor(s) to facilitate simulating continuity between separate media items. The machine-readable instructions may include one or more computer program components. The computer program components may include one or more of a media item component, a scene component, an in-between visual content component, a combined visual content component, and/or other computer program components.

The media item component may be configured to obtain media item information and/or other information. The media item information may define a first media item, a second media item, and/or other media items. The first media item may include first visual content depicting a first scene. The second media item may include second visual content depicting a second scene. Other media items may include other visual content depicting other scenes.

In some implementations, the first media item may include a first image and the second media item may include a second image. In some implementations, the first media item may include an image and the second media item may include a video. In some implementations, the first media item may include a first video and the second media item may include a second video.

The scene component may be configured to determine scenes depicted in the visual content. The scene component may determine the first scene depicted in the first visual content, the second scene depicted in the second visual content, and/or other scenes depicted in other visual content.

In some implementations, determination of a scene depicted in visual content may include: segmentation of the visual content into a background portion, a foreground portion, and/or other portions; and classification of the background portion of the visual content.

The in-between visual content component may be configured to generate in-between visual content to fill a visual gap between two visual content. The in-between visual content component may generate in-between visual content to fill a visual gap between the first visual content and the second visual content. The in-between visual content to fill the visual gap between the first visual content and the second visual content may be generated based on the first scene depicted in the first visual content, the second scene depicted in the second visual content, and/or other information.

In some implementations, generation of the in-between visual content based on a scene depicted in visual content may include generation of the in-between visual content based on the classification of the background portions of the visual content.

The combined visual content component may be configured to generate combined visual content. The combined visual content may be generated by using the in-between visual content to fill the visual gap(s) between different visual content. The combined visual content may be generated by using the in-between visual content to fill the visual gap between the first visual content and the second visual content. In some implementations, the combined visual content may provide a panoramic view of the first scene and the second scene.

In some implementations, presentation of the combined visual content may include panning from the first visual content to the second visual content. The in-between visual content may provide visual continuity between the first visual content and the second visual content during the panning. In some implementations, a directional blur may be applied to the in-between visual content to simulate camera movement during the panning.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
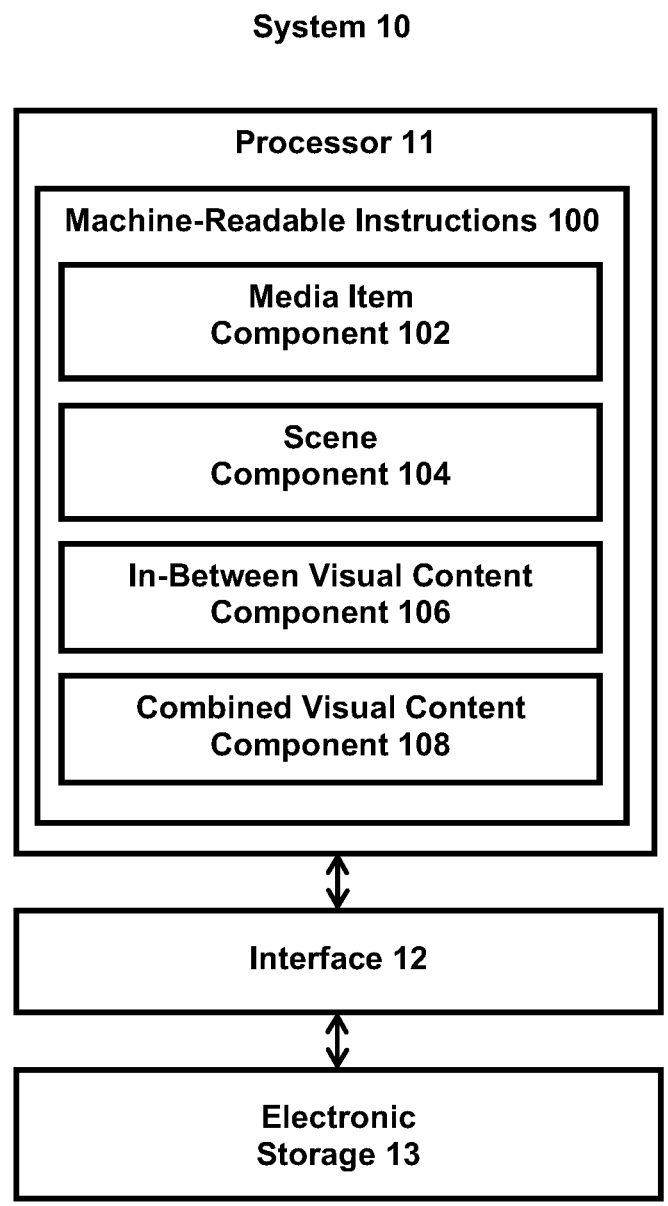
FIG. 1 illustrates a system for simulating continuity between separate media items.

FIG. 1 illustrates a system 10 for simulating continuity between separate media items. The system 10 may include one or more of a processor 11, an interface 12 (e.g., bus, wireless interface), an electronic storage 13, and/or other components. The system 10 may include and/or be part of an image capture device. Media item information and/or other information may be obtained by the processor 11. The media item information may define a first media item, a second media item, and/or other media items. The first media item may include first visual content depicting a first scene. The second media item may include second visual content depicting a second scene. The first scene depicted in the first visual content and the second scene depicted in the second visual content may be determined by the processor 11. In-between visual content may be generated to fill a visual gap between the first visual content and the second visual content. The in-between visual content may be generated by the processor 11 based on the first scene depicted in the first visual content, the second scene depicted in the second visual content, and/or other information. Combined visual content may be generated by the processor 11 by using the in-between visual content to fill the visual gap between the first visual content and the second visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store media item information, information relating to media items, information relating to visual content, information relating to scenes depicted in visual content, information relating to in-between visual content, information relating to visual gap between visual content, information relating to combined visual content, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Media items may refer to items that may be visually and/or audibly consumed. Media items may refer to multimedia items. For example, media items may include images, videos, and/or other media items. Media items may be captured by one or more image capture devices.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

The system 10 may be remote from an image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate simulating continuity between separate media items. The machine-readable instructions 100 may include one or more computer program components. The machine-readable instructions 100 may include one or more of a media item component 102, a scene component 104, an in-between visual content component 106, a combined visual content component 108, and/or other computer program components.

The media item component 102 may be configured to obtain media item information and/or other information. Obtaining media item information may include one or more of accessing, acquiring, analyzing, capturing, determining, examining, generating, identifying, loading, locating, opening, receiving, retrieving, reviewing, selecting, storing, and/or otherwise obtaining the media item information. The media item component 102 may obtain media item information from one or more locations. For example, the media item component 102 may obtain media item information from a storage location, such as the electronic storage 13, electronic storage of information and/or signals generated by one or more sensors, electronic storage of a device accessible via a network, and/or other locations. The media item component 102 may obtain media item information from one or more hardware components (e.g., an image sensor) and/or one or more software components (e.g., software running on a computing device).

In some implementations, the media item component 102 may obtain media item information based on user interaction with a user interface/application (e.g., image/video editing application, image/video player application), and/or other information. For example, a user interface/application may provide option(s) for a user to combine visual content of media items and/or create transitions between media items. The media item information defining the media item(s) may be obtained based on the user's selection of the media item(s) through the user interface/application. Other selections of media items for retrieval of media item information are contemplated.

The media item information may define multiple media items, such as a first media item, a second media item, and/or other media items. The media item information may define a media item by including information that defines one or more content, qualities, attributes, features, and/or other aspects of the media item. For example, the media item information may define a media item by including information that makes up the content of the media item and/or information that is used to determine the content of the media item. For instance, the media item information may include information that makes up and/or is used to determine content of images and/or videos, and/or other information that defines the images and/or videos. The media item information may be stored within a single file or multiple files. Other types of media item information are contemplated.

The media item information may define media items of same type or different types. For example, the media item information may define media items of image type (e.g., the first media item includes a first image and the second media item includes a second image), media items of video type (e.g., the first media item includes a first video and the second media item includes a second video), or media items of both image type and video type (e.g., the first media item includes an image and the second media item includes a video). Other combinations of same or different types of media items are contemplated.

A media item may include visual content. A media item may include static visual content (e.g., visual content of a static image) or dynamic visual content (e.g., visual content changing between video frames). Visual content of a media item may depict one or more scenes. For example, the first media item may include first visual content depicting a first scene and the second media item may include second visual content depicting a second scene. Other media items may include other visual content depicting other scenes.

Visual content of a media item may depict scene(s) captured by one or more image capture devices. A scene may refer to a place and/or a location in which the image capture device(s) are located while capturing visual content. A scene may refer to a place and/or a location that is captured by the image capture device(s). A scene may include one or more portions of a place and/or a location at which the image capture device(s) are directed during capture of the visual content. A scene may include one or more portions of a place and/or a location that are within the field of view of the image capture device(s) during capture of the visual content. A scene may include static things (e.g., environment, non-moving objects) and/or dynamic things (e.g., moving objects).

Figure 3:
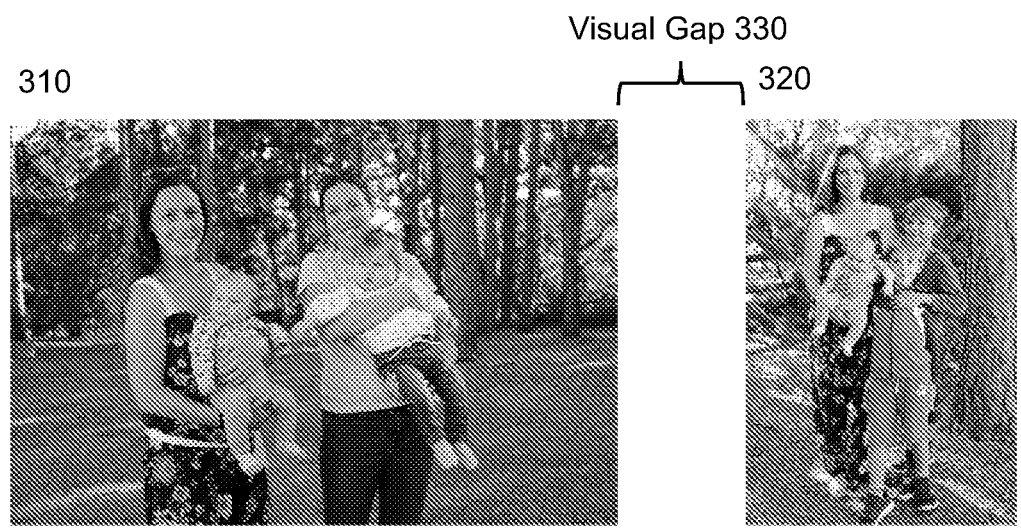
FIG. 3 illustrates example images.

For example, FIG. 3 illustrates example images 310, 320. The images 310, 320 may depict a forest scene captured by an image capture device. The images 310, 320 may depict people that were within the forest scene during visual content capture by the image capture device.

The scene component 104 may be configured to determine scenes depicted in the visual content. For example, the scene component 104 may determine the first scene depicted in the first visual content of the first media item, the second scene depicted in the second visual content of the second media item, and/or other scenes depicted in other visual content of other media items. Determining a scene depicted within visual content may include ascertaining, classifying, detecting, establishing, finding, identifying, obtaining, and/or otherwise determining the scene depicted within the visual content. Determining a scene depicted within visual content may include determining the place and/or the location in which the image capture device(s) were located while capturing the visual content. Determining a scene depicted within visual content may include determining the place and/or the location that were captured by the image capture device(s). Determining a scene depicted within visual content may include determining a type of scene depicted within the visual content.

Scene determination may be performed based on user selection, analysis of the visual content, and/or other information. User selection for scene determination may include reception of user input that identifies/indicates the scene/type of scene depicted within the visual content. Analysis of visual content may include analysis of the content of image(s)/video(s), such as analysis of the arrangement of pixels, characteristics of pixels, values of pixels, and/or other aspects of pixels of the visual content. Analysis of visual content may include use of computer vision and/or other scene detection/recognition techniques to determine what scene is depicted within the visual content. Analysis of visual content may provide one or more probability on what scene is depicted within the visual content.

In some implementations, scene determination may include segmentation of the visual content into different portions. For example, determination of a scene depicted in visual content may include: segmentation of the visual content into a background portion, a foreground portion, and/or other portions. A foreground portion of the visual content may refer to the portion of the visual content that depicts objects/things that are closer to the image capture device(s). A foreground portion of the visual content may refer to the portion of the visual content that depicts prominent and/or important features. A foreground portion of the visual content may refer to the portion of the visual content that depicts a subject of the visual content. A background portion of the visual content may refer to the portion of the visual content that depicts objects/things that are farther from the image capture device(s). A background portion of the visual content may refer to the portion of the visual content that depicts the area or the scenery behind prominent/important features and/or the subject of the visual content.

Classification may be performed on the background portion of the visual content to determine the scene depicted within the visual content. Classifying the background portion of the visual content may include categorizing, characterizing, describing, defining, identifying, grouping, quantifying, and/or otherwise classifying objects/things depicted within the background portion of the visual content. For example, classifying the background portion of the visual content may include identifying the area or the scenery depicted in the background portion. The classification result of the background portion may be used as the identity/type of the scene depicted in the visual content.

For example, referring to FIG. 3, segmentation may be performed on the images 310, 320 to separate the forest scene (background portion) from the people (foreground portion) depicted within the images 310, 320. Classification of the background portion may result in the forest scene being identified as the scene depicted within the images 310, 320.

The in-between visual content component 106 may be configured to generate in-between visual content to fill a visual gap between two visual content. The in-between visual component 106 may be configured to generate in-between visual content to fill one or more visual gaps between multiple visual content. For example, the in-between visual content component 106 may generate in-between visual content to fill a visual gap between the first visual content of the first media item and the second visual content of the second media item.

A visual gap between two visual content may refer to a break in visual continuity between the two visual content. A visual gap between two visual content may refer to an unfiled space or an interval between the two visual content. A visual gap may exist between two visual content due to things depicted along edges of the two visual content not matching with each other. A visual gap may exist between two visual content due to placement of the two visual content with some space between the two visual content.

For example, referring to FIG. 3, placing the images 310, 320 right next to each other (so that the right edge of the image 310 touches the left edge of the image 320) may result in a combined image with a discontinuity. Such placement of the images 310, 320 may result in a combined image that looks unnatural or less pleasing. Rather than placing the images right next to each other, the images may be positioned to have a visual gap 330 between them. The in-between visual component 106 may generate in-between visual content to fill the visual gap 330 between the visual content of the images 310, 320.

Figure 4:
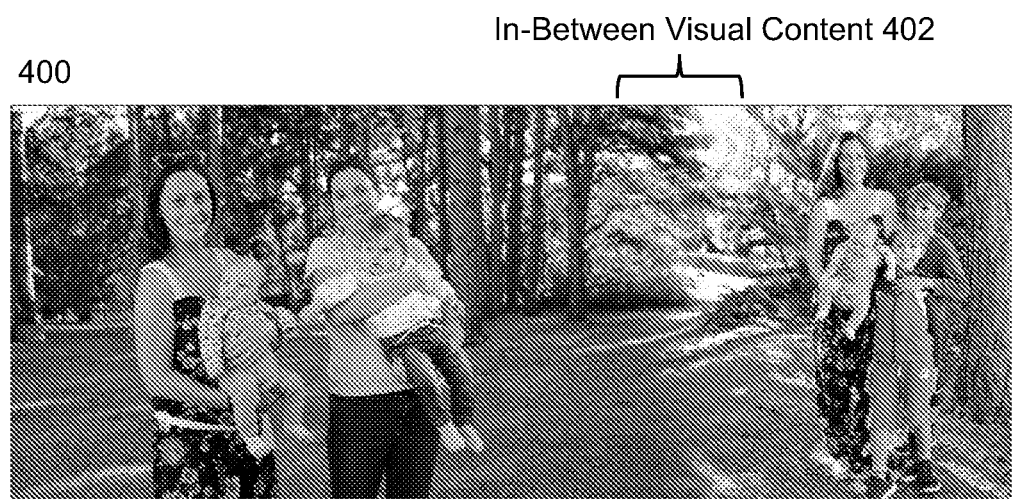
FIG. 4 illustrates an example combined image.

In-between visual content may be generated to provide visual continuity between different visual content. In-between visual content may be generated to create visual continuity from one visual content to another visual content. For example, referring to FIG. 3, in-between visual content may be generated to create visual continuity from the right edge of the image 310 to the left edge of the image 320. FIG. 4 illustrates an example combined image 400. The combined image 400 may be generated by combining the images 310, 320 by filling the visual gap 330 with in-between visual content 402. The in-between visual content 402 may make the combined image 400 looks like a cohesive single image, rather than two separate images.

In-between visual content to fill a visual gap between two visual content may be generated based on the scenes depicted in the two visual content and/or other information. For example, the in-between visual content to fill the visual gap between the first visual content of the first media item and the second visual content of the second media item may be generated based on the first scene depicted in the first visual content, the second scene depicted in the second visual content, and/or other information. In-between visual content to fill a visual gap between two visual content may be generated based on visual discontinuities between the scenes depicted within the two visual content.

Generation of the in-between visual content based on the scenes depicted within multiple visual content may include generation of the in-between visual content based on the place and/or the location depicted within the multiple visual content. Generation of the in-between visual content based on the scenes depicted within multiple visual content may include generation of the in-between visual content based on the type(s) of scene depicted within the multiple visual content. For multiple visual content depicting the same type of scene, the in-between visual content may be generated to include the single type of scene. For multiple visual content depicting different types of scene, the in-between visual content may be generated to include the different types of scenes, with a smooth/gradual transition between the different types of scene.

The smooth/gradual transition between different types of scene may include non-abrupt changes in shape and/or color of things depicted within the in-between visual content. The edges of the visual content closest to the visual gap may be used as constraints in generation of the in-between visual content. The edges of the visual content closest to the visual gap may be used to match the edges of the in-between visual content with the edges of the visual content. The edges of the visual content closest to the visual gap may be used to make sides of the in-between visual content appear to be part of the same scene(s) as depicted at the edges of the visual content. In some implementations, one or more machine learning models may be used to generate in-between visual content based on the scenes depicted within multiple visual content.

In some implementations, generation of the in-between visual content based on the scene(s) depicted in visual content may include generation of the in-between visual content based on the classification of the background portions of the visual content. For example, the classification result of the background portions of two visual content may be used as the identity/type of the scene to be depicted within the in-between visual content for the two visual content. The classification result of the background portion of the visual content may be used as the description to seed the tool (e.g., machine learning tool, infill painting algorithm) to generate the in-between visual content. For example, an image-to-text model may be used to obtain descriptions of backgrounds of two images, and the background descriptions of the images may be used as an input to a text-to-image model to fill the visual gap between the images.

In some implementation, generation of in-between visual content may prioritize visual similarity over context similarity. Generation of in-between visual content may prioritize visual similarity between the in-between visual content and the scene(s) depicted within the images over similarity between context of things depicted within the images. Such prioritization may result in the in-between visual content including visually realistic but semantically odd results. While the overall visual characteristics of the in-between visual content may fit between the images, the actual content of the in-between visual content may not match with the content of the images.

Such context-poor in-between visual content may still be used to fill a visual gap between two images, especially when the in-between visual content is used to momentarily provide transition between the two images. For example, rather than presenting all of the images and the in-between visual content (combined visual content) at once, small part of the combined visual content may be presented on an electronic display. That is, the presentation of the combined visual content may include a punchout of the combined visual content. The placement of the punchout may change to go from one visual content to the other visual content. The change in placement of the punchout may include crossing over the in-between visual content. Even if the in-between visual content has poor context matching with the visual content of the images, the transitory use of the in-between visual content to connect the images in a punchout presentation may make such difference in context negligible.

The combined visual content component 108 may be configured to generate combined visual content. The combined visual content may include multiple visual content and the in-between visual content. The combined visual content may be generated by using the in-between visual content to fill the visual gap(s) between different visual content. For example, the combined visual content may be generated by using the in-between visual content to fill the visual gap between the first visual content and the second visual content. For example, as shown in FIGS. 3 and 4, combined visual content of the combined image 400 may be generated by using the in-between visual content 402 to fill the visual gap 330 between the images 310, 320.

In some implementations, the combined visual content may provide a panoramic view of different scene depicted by different visual content. For example, the combined visual content may provide a panoramic view of the first scene depicted in the first visual content of the first media item and the second scene depicted in the second visual content of the second media item. Other numbers of images may be joined via use of the in-between visual content.

Figure 5:
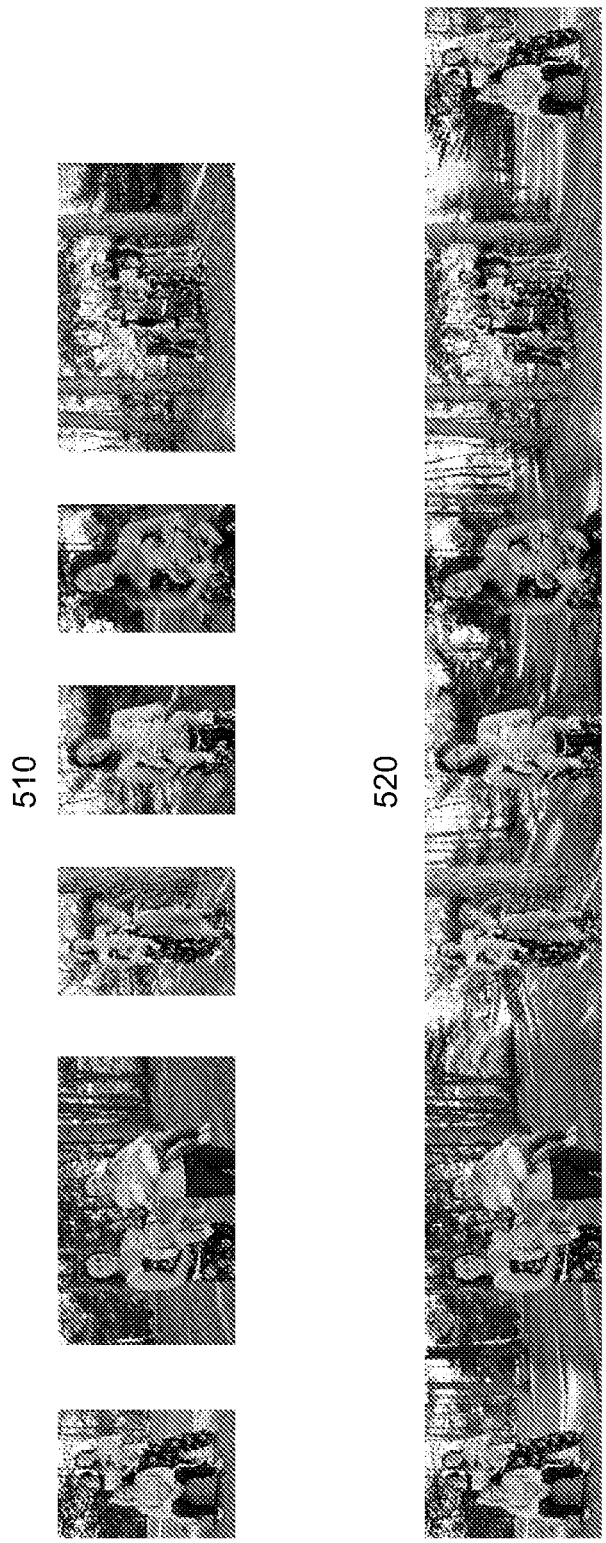
FIG. 5 illustrates example images and an example combined image.

FIG. 5 illustrates example images 510 and an example combined image 520. The images 510 may include visual gaps between them, and in-between visual content may be generated for the visual gaps to generate the combined image 520.

In some implementations, the combined visual content may be generated to include a loop. The visual content of an image may be used at both the beginning and the ending of the combined visual content. For example, in FIG. 5, the visual content of the left most image may be used at the left end and the right end of the combined visual content of the combined image 520. Generating the combined visual content to include such a loop may enable the presentation of the combined visual content to appear to loop back to the first image.

The combined visual content may be presented on one or more electronic displays. In some implementations, entirety of the combined visual content may be presented at once. In some implementations, one or more portions of the combined visual content may be presented at once. For example, a punchout of one or more parts of the combined visual content may be presented on an electronic display.

In some implementations, presentation of the combined visual content may include panning between different visual content included in the combined visual content. For example, for combined visual content generated to include the first visual content of the first media item and the second visual content of the second media item, the presentation may pan from the first visual content to the second visual content, or vice versa. Panning between the different visual content may cross over the in-between visual content. The in-between visual content may provide visual continuity between the first visual content and the second visual content during the panning.

In some implementations, a directional blur may be applied to the in-between visual content to simulate camera movement during the panning. Application of the directional blur to the in-between visual content may reduce the impact of any mismatch between the in-between visual content and the visual content of media items, such as the in-between visual content that has poor context matching with surrounding visual content.

In some implementations, the panning between different visual content may be performed with different speeds. For example, the panning may be performed with faster speed when the punchout includes/is about to include the in-between visual content than when the punchout includes only the visual content of the media items. By increasing the speed of panning when the punchout includes/is about to include the in-between visual content, the impact of any mismatch between the in-between visual content and the visual content of media items may be reduced.

In-between visual content may be used to create interesting/pleasing transitions between visual content of different media items. In-between visual content may be leveraged to generate a seamless loop playback of multiple visual content, where the presentation continuously transitions between different visual content and loops back to the first visual content after the last visual content has been reached.

Figure 6:
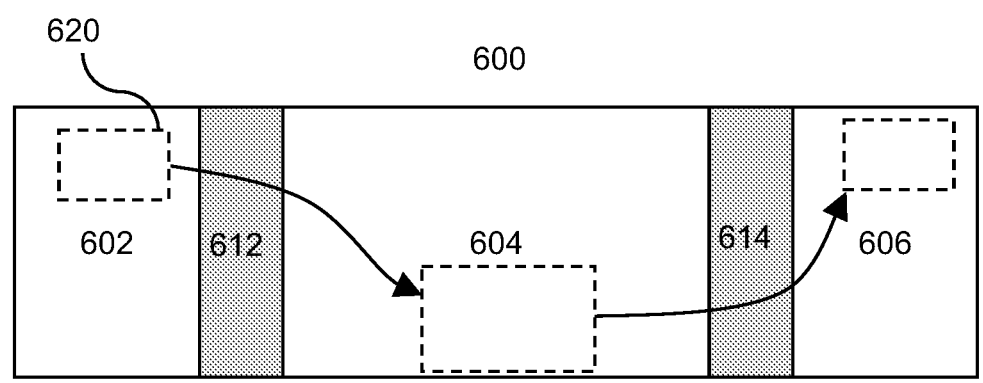
FIG. 6 illustrates an example transition between three media items.

FIG. 6 illustrates an example transition between three media items. A combined visual content 600 may include three visual content 602, 604, 606 of three media items. In-between visual content 612 may be generated to fill a visual gap between the visual content 602, 604, and in-between visual content 614 may be generated to fill a visual content between the visual content 604, 606. A punchout of the combined visual content 600 may be presented by presenting the extent of the combined visual content 600 within a viewing window 620. The placement of the viewing window 620 within the combined visual content 600 may change over time to present different parts of the combined visual content. As the viewing window 620 moves between different visual content 602, 604, 606, the in-between visual content 612, 614 may provide visual continuity between the different visual content 602, 604, 606.

In-between visual content may be used to generate transitions between images, between videos, and/or between images and videos. Between an image and a video, one or more in-between visual content may be generated by using the scene depicted in the image and the scene depicted in video frames of the video. In some implementations, rather than generating in-between visual content for every unique image-video frame pair, in-between visual content may be generated for groups of image-video frame pairs that have the same scene combination. For example, a video may include a first set of video frames that depict one scene and a second set of video frames that depict another scene. Different in-between visual content may be generated between an image and the first set of video frames, and the image and the second set of video frames. A video frame from a set of video frames may be used to generate the in-between visual content for the entire set of video frames. The video frame that is used to generate the in-between visual content may include the first video frame in the group, the last video frame in the group, or the video frame that is most visible in the transition between the video and the image.

Between two videos, one or more in-between visual content may be generated by using the scenes depicted in video frames of the videos. Separate in-between visual content may be generated for every unique video frame pairs. In-between visual content may be generated for groups of video frame pairs.

Figure 7A:
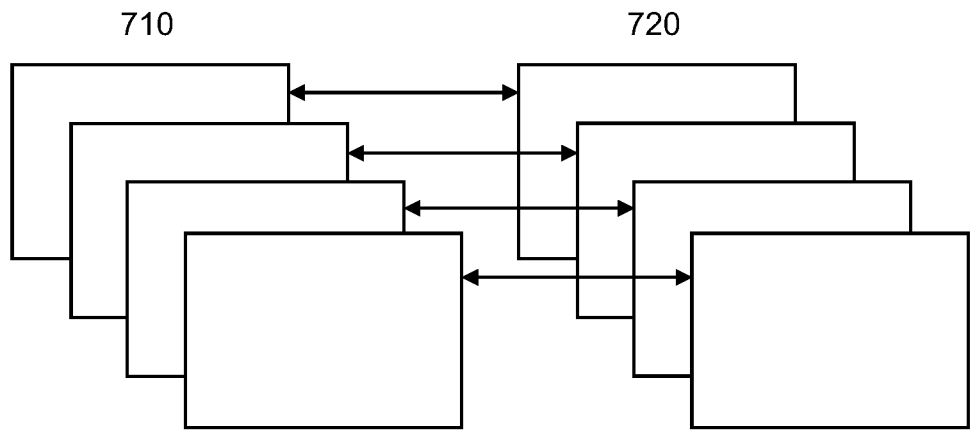
FIG. 7A illustrates example generation of in-between visual content for video frames of separate videos.
Figure 7B:
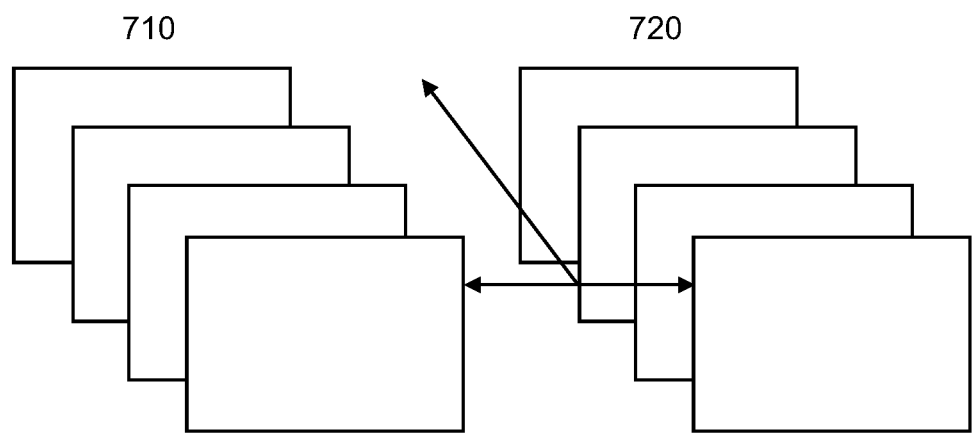
FIG. 7B illustrates example generation of in-between visual content for video frames of separate videos.

FIGS. 7A and 7B illustrate example generation of in-between visual content for video frames of separate videos. One video may include video frames 710 and another video may include video frames 720. In FIG. 7A, individual video frames 710, 720 may be paired up with each other to generate in-between visual content to fill the visual gaps between individual pairs of video frames. In FIG. 7B, in-between visual content generated using a pair of video frames may be used to fill the visual gaps between other pairs of video frames. That is, the same in-between visual content may be used to fill the visual gaps between multiple pairs of video frames. Other generation of in-between visual content is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
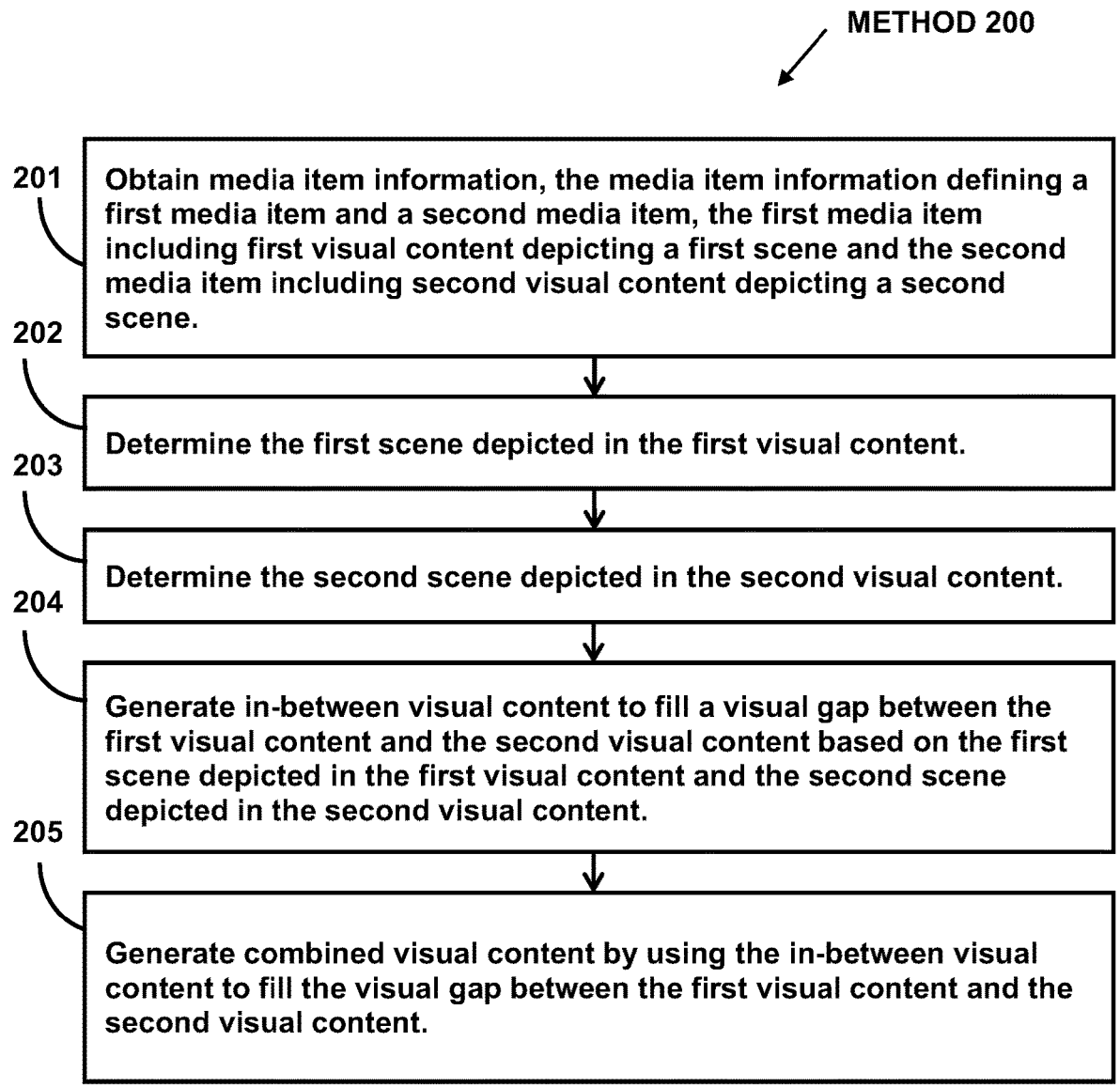
FIG. 2 illustrates a method for simulating continuity between separate media items.

FIG. 2 illustrates method 200 for simulating continuity between separate media items. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, media item information may be obtained. The media item information may define a first media item and a second media item. The first media item may include first visual content depicting a first scene. The second media item may include second visual content depicting a second scene. In some implementations, operation 201 may be performed by a processor component the same as or similar to the media item component 102 (Shown in FIG. 1 and described herein).

At operation 202, the first scene depicted in the first visual content may be determined. In some implementations, operation 202 may be performed by a processor component the same as or similar to the scene component 104 (Shown in FIG. 1 and described herein).

At operation 203, the second scene depicted in the second visual content may be determined. In some implementations, operation 203 may be performed by a processor component the same as or similar to the scene component 104 (Shown in FIG. 1 and described herein).

At operation 204, in-between visual content may be generated to fill a visual gap between the first visual content and the second visual content. The in-between visual content may be generated based on the first scene depicted in the first visual content and the second scene depicted in the second visual content. In some implementations, operation 204 may be performed by a processor component the same as or similar to the in-between visual content component 106 (Shown in FIG. 1 and described herein).

At operation 205, combined visual content may be generated by using the in-between visual content to fill the visual gap between the first visual content and the second visual content. In some implementations, operation 204 may be performed by a processor component the same as or similar to the combined visual content component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for simulating continuity between separate media items, the system comprising:
   one or more physical processors configured by machine-readable instructions to:
   obtain media item information, the media item information defining a first media item and a second media item, the first media item including first visual content depicting a first scene and the second media item including second visual content depicting a second scene;
   determine the first scene depicted in the first visual content;
   determine the second scene depicted in the second visual content;
   generate in-between visual content to fill a visual gap between the first visual content and the second visual content based on the first scene depicted in the first visual content and the second scene depicted in the second visual content;
   generate combined visual content by using the in-between visual content to fill the visual gap between the first visual content and the second visual content, the combined visual content providing a panoramic view of the first scene and the second scene; and
   generate a presentation of the combined visual content, the presentation of the combined visual content including a punchout of extents of the combined visual content within a viewing window, wherein the viewing window moves across the in-between visual content to move between the first visual content and the second visual content, further wherein the in-between visual content is used to momentarily provide transition between the first visual content and the second visual content in the presentation of the combined visual content, the in-between visual content providing visual continuity between the first visual content and the second visual content, the viewing window moving faster when the viewing window includes the in-between visual content.

2. The system of claim 1, wherein:
   determination of the first scene depicted in the first visual content includes:
   segmentation of the first visual content into a background portion and a foreground portion;
   classification of the background portion of the first visual content; and
   generation of the in-between visual content based on the first scene depicted in the first visual content includes generation of the in-between visual content based on the classification of the background portion of the first visual content.

3. The system of claim 1, wherein generation of the in-between visual content prioritizes visual similarity over context similarity.

4. The system of claim 1, wherein a directional blur is applied to the in-between visual content to simulate camera movement during the movement of the viewing window.

5. A system for simulating continuity between separate media items, the system comprising:
   one or more physical processors configured by machine-readable instructions to:

obtain media item information, the media item information defining a first media item and a second media item, the first media item including first visual content depicting a first scene and the second media item including second visual content depicting a second scene;

determine the first scene depicted in the first visual content;

determine the second scene depicted in the second visual content;

generate in-between visual content to fill a visual gap between the first visual content and the second visual content based on the first scene depicted in the first visual content and the second scene depicted in the second visual content;

generate combined visual content by using the in-between visual content to fill the visual gap between the first visual content and the second visual content; and generate a presentation of the combined visual content, the presentation of the combined visual content including a punchout of extents of the combined visual content within a viewing window, wherein:

the viewing window moves across the in-between visual content to move between the first visual content and the second visual content;

the viewing window moves faster when the viewing window includes the in-between visual content; and the in-between visual content is used to momentarily provide transition between the first visual content and the second visual content in the presentation of the combined visual content.

6. The system of claim 5, wherein:
determination of the first scene depicted in the first visual content includes:
segmentation of the first visual content into a background portion and a foreground portion;
classification of the background portion of the first visual content; and
generation of the in-between visual content based on the first scene depicted in the first visual content includes generation of the in-between visual content based on the classification of the background portion of the first visual content.

7. The system of claim 5, wherein generation of the in-between visual content prioritizes visual similarity over context similarity.

8. The system of claim 5, wherein a directional blur is applied to the in-between visual content to simulate camera movement during the movement of the viewing window.

9. The system of claim 5, wherein the combined visual content provides a panoramic view of the first scene and the second scene.

10. The system of claim 5, wherein the first media item includes a first image and the second media item includes a second image.

11. The system of claim 5, wherein the first media item includes an image and the second media item includes a video.

12. The system of claim 5, wherein:
the first media item includes a first video including a first set of video frames and the second media item includes a second video including a second set of video frames;
a video frame from the first set of video frames and a video frame from the second set of video frames are used to generate the in-between visual content; and
the in-between visual content is used to fill visual gaps between the first set of video frames and the second set of video frames.

13. A method for simulating continuity between separate media items, the method performed by a computing system including one or more processors, the method comprising:

obtaining, by the computing system, media item information, the media item information defining a first media item and a second media item, the first media item including first visual content depicting a first scene and the second media item including second visual content depicting a second scene;

determining, by the computing system, the first scene depicted in the first visual content;

determining, by the computing system, the second scene depicted in the second visual content;

generating, by the computing system, in-between visual content to fill a visual gap between the first visual content and the second visual content based on the first scene depicted in the first visual content and the second scene depicted in the second visual content;

generating, by the computing system, combined visual content by using the in-between visual content to fill the visual gap between the first visual content and the second visual content; and generating a presentation of the combined visual content, the presentation of the combined visual content including a punchout of extents of the combined visual content within a viewing window, wherein:

the viewing window moves across the in-between visual content to move between the first visual content and the second visual content;

the viewing window moves faster when the viewing window includes the in-between visual content; and the in-between visual content is used to momentarily provide transition between the first visual content and the second visual content in the presentation of the combined visual content.

14. The method of claim 13, wherein determining the first scene depicted in the first visual content includes:
segmentation of the first visual content into a background portion and a foreground portion;
classification of the background portion of the first visual content; and
generation of the in-between visual content based on the first scene depicted in the first visual content includes generation of the in-between visual content based on the classification of the background portion of the first visual content.

15. The method of claim 13, wherein generation of the in-between visual content prioritizes visual similarity over context similarity.

16. The method of claim 13, wherein a directional blur is applied to the in-between visual content to simulate camera movement during the movement of the viewing window.

17. The method of claim 13, wherein the combined visual content provides a panoramic view of the first scene and the second scene.

18. The method of claim 13, wherein the first media item includes a first image and the second media item includes a second image.

19. The method of claim 13, wherein the first media item includes an image and the second media item includes a video.

20. The method of claim 13, wherein:
the first media item includes a first video including a first set of video frames and the second media item includes a second video including a second set of video frames;
a video frame from the first set of video frames and a video frame from the second set of video frames are used to generate the in-between visual content; and
the in-between visual content is used to fill visual gaps between the first set of video frames and the second set of video frames.

* * * * *